(12) United States Patent
Harding et al.

(10) Patent No.: US 6,573,906 B1
(45) Date of Patent: Jun. 3, 2003

(54) METHOD AND SYSTEM FOR DELIVERING INTEGRATED USER ASSISTANCE INFORMATION AND TRADITIONAL HELP FROM THE SAME SOURCE

(75) Inventors: Andrew Richard Harding, Scotts Valley, CA (US); Lee Anne Kowalski, Cupertino, CA (US); John David Russell, Foster City, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/466,349

(22) Filed: Dec. 17, 1999

Related U.S. Application Data

(60) Provisional application No. 60/131,107, filed on Apr. 26, 1999.

(51) Int. Cl.[7] ................................. G09G 5/00
(52) U.S. Cl. ................ 345/705; 345/711; 345/715; 345/760
(58) Field of Search .................... 345/705–715, 345/760; 707/501.1, 513

(56) References Cited

U.S. PATENT DOCUMENTS

| | | | |
|---|---|---|---|
| 4,494,114 A | | 1/1985 | Kaish |
| 5,103,498 A | | 4/1992 | Lanier et al. |
| 5,535,422 A | | 7/1996 | Chiang et al. |
| 5,550,967 A | | 8/1996 | Brewer et al. |
| 5,581,684 A | | 12/1996 | Dudzik et al. |
| 5,706,437 A | | 1/1998 | Kirchner et al. |
| 5,774,118 A | * | 6/1998 | Hatakama ............... 345/707 |
| 5,787,416 A | | 7/1998 | Tabb et al. |
| 5,818,345 A | | 10/1998 | Sjooquist |
| 5,825,356 A | | 10/1998 | Habib et al. |
| 5,893,916 A | | 4/1999 | Dooley |
| 5,995,101 A | * | 11/1999 | Clark et al. ............. 345/711 |
| 6,014,134 A | * | 1/2000 | Bell et al. ............... 345/705 |
| 6,028,601 A | * | 2/2000 | Machiraju et al. ....... 345/705 |
| 6,078,935 A | * | 6/2000 | Nielsen .................. 345/707 |
| 6,092,068 A | * | 7/2000 | Dinkelacker ............ 345/707 |
| 6,304,259 B1 | * | 10/2001 | DeStafano ............... 345/764 |

FOREIGN PATENT DOCUMENTS

GB        1537759        6/1976

* cited by examiner

Primary Examiner—Sy D. Luu
(74) Attorney, Agent, or Firm—Sawyer Law Group LLP

(57) ABSTRACT

A method and system in accordance with the present invention allows the help information to be shared independent of its invocation method, so that the information can be displayed in both integrated user assistance mechanisms and traditional online help windows. The method includes receiving an invocation of one of a plurality of user assistance mechanisms; and collecting help information from an information source, the information source comprising a structure indicating what portion of the information source is to be displayed based upon the invoked user assistance mechanism. With a method and system in accordance with the present invention, help authors place a metastructure or secondary structure in the information source. This secondary structure indicates which parts of the information source should be displayed by that particular integrated user assistance mechanism. A method and system in accordance with the present invention reads the information source and secondary structure and then takes the information defined by the secondary structure and passes it to the integrated user assistance mechanism to be displayed. For example, the same text information can be retrieved from one source and displayed in the following three places—a traditional online help window, inline text in a software dialog, inside a pop-up window over a control. With the method and system in accordance with the present invention, the author only has to maintain one source, so that both the integrated user assistance mechanism and the traditional online help will contain the accurate information.

24 Claims, 6 Drawing Sheets

402

▫ New database name

Database names are the identifiers assigned to databases in the database manager. These names must be unique within this database manager.

Type a name for the new database. The name:

- Must contain 1 to 8 characters
- Must begin with one of the letters A through Z (uppercase or lowercase), or @, #, or $
- Can include the letters A through Z (uppercase or lowercase), the digits 0 through 9, and @, #, $, and _ (underscore)

Note: To avoid potential problems, do not use the special characters @, #, and $ in a database name if you intend to use the database in a communications environment. Also, because the characters @, #, and $ are not common to all keyboards, do not use them if you plan to use the database in another country.

▫ Default drive or directory

Unless you override the default drive, the User Tables, Catalog Tables, and Temporary Tables will be stored here. The database configuration file and the database recovery log will also be stored here.

FIG. 4

```
<A NAME="SPTCRDB_NAME_CTL"></A>

<P>

<B><IMG SRC="./pbullet.gif" ALT="Figure pbullet not displayed." ></B> <B>New database
name</B>

<P>Database names are identifiers assigned to databases in the database manager. These names must
be unique within this database manager.

<P>Type a name for the new database. The name:

<UL COMPACT>

<LI>Must contain 1 to 8 characters

<LI>Must begin with one of the letters A through Z (uppercase or lowercase),
or @, #, or $ <LI>Can include the letters A through Z (uppercase or lowercase), the digits 0 through 9, and @, #, $,
and _ (underscore)

</UL>

<P><A NAME="SPTCRDB_NAME_MORE"></A>

<TABLE><TR><TD ALIGN="LEFT" VALIGN="TOP"><B>Note:</B></TD><TD
ALIGN="LEFT" VALIGN="TOP">To avoid potential problems, do not use the special characters @,
#, and $ in a database name if you intend to use the database in a communications environment. Also,
because the characters @, #, and $ are not common to all keyboards, do not use them if you plan to use
the database in another country.

</TD></TR></TABLE>

<A NAME="SPTCRDB_DRIVE_CTL"></A>

<P>

<B><IMG SRC=".pbullet.gif" ALT="Figure pbullet not displayed."></B><B>Default drive or
directory </B>

<P>Unless you override the default drive, the User Tables, Catalog Tables, and Temporary Tables will
be stored here. The database configuration file and the database recovery log will also be stored here.
```

FIG. 5

METHOD AND SYSTEM FOR DELIVERING INTEGRATED USER ASSISTANCE INFORMATION AND TRADITIONAL HELP FROM THE SAME SOURCE

This application claims the benefit of provisional application Ser. No. 60/131,107 filed Apr. 26, 1999.

FIELD OF THE INVENTION

The present invention relates to a computer system and method for delivering integrated user assistance information and traditional help from the same source in such a system.

BACKGROUND OF THE INVENTION

A method and system in accordance with the present invention is a method that allows the same information source to be shared and used for both integrated user assistance and traditional online help, regardless of its invocation method.

The term "user assistance" is used to describe mechanisms that help users use a product more efficiently. Things that fall into this category are books (hardcopy and online), wizards, online help, screen prompts, labels for graphical user interface (GUI) controls, and messages. The term "integrated user assistance" is used to describe the mechanisms that deliver assistance to users within software product dialogs themselves. In a software application, these are examples of integrated user assistance: wizards, inline text (single and multi-line text within the product dialogs), hover help (text boxes that appear relative to GUI controls), and pop-up windows (text boxes that appear over fields and controls in response to user action). Lastly, the term, "traditional online help" in a software application is used to describe that information that is usually displayed in a window separate from the software application dialogs and is typically invoked when the user clicks a Help button.

A method and system in accordance with the present invention allows the same textual information or a subset of the information to be displayed by both integrated user assistance mechanisms (for example, in a pop-up window or as inline text) and the traditional online help window. Conventionally help authors have to store the exact same information in two separate physical sources. One source file would contain the information to be loaded when the integrated user assistance mechanism is invoked and the other source file would contain the same information to be loaded when the traditional online help window is invoked (typically by pressing a Help button). The problem is that the author has to continuously ensure that the information in both physical places is the same at all times and keep the sources in sync. If the help author fails to update both physical places with updated information, the user will see different information that purportedly describes the same thing, depending on whether he invokes the integrated user assistance mechanism or the traditional online help. In this situation, the user would not be able to tell which one held the accurate information. The duplication also increases storage requirements.

Accordingly, what is needed is a system and method for allowing a user to minimize the need to store the same information in multiple sources. The system and method should be easy to implement and cost effective. The present invention addresses such a need.

SUMMARY OF THE INVENTION

A method and system in accordance with the present invention allows the help information to be shared independent of its invocation method, so that the information can be displayed in both integrated user assistance mechanisms and traditional online help windows. The method includes receiving an invocation of one of a plurality of user assistance mechanisms; and collecting help information from an information source, the information source comprising a structure indicating what portion of the information source is to be displayed based upon the invoked user assistance mechanism. With a method and system in accordance with the present invention, help authors place a metastructure or secondary structure in the information source. This secondary structure indicates which parts of the information source should be displayed by that particular integrated user assistance mechanism. A method and system in accordance with the present invention reads the information source and secondary structure and then takes the information defined by the secondary structure and passes it to the integrated user assistance mechanism to be displayed. For example, the same text information can be retrieved from one source and displayed in the following three places—a traditional online help window, inline text in a software dialog, inside a pop-up window over a control. With the method and system in accordance with the present invention, the author only has to maintain one source, so that both the integrated user assistance mechanism and the traditional online help will contain the accurate information.

BRIEF DESCRIPTION OF THE DRAWINGS

FIG. 4 illustrates a help online window in accordance with the present invention.

FIG. 5 shows the source files for the information shown in FIG. 4.

DETAILED DESCRIPTION

The present invention relates to a method that allows the same information source to be shared and used for both integrated user assistance and traditional online help, regardless of its invocation method. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The term "user assistance" is used to describe mechanisms that help users use a product more efficiently. Things that fall into this category are books (hardcopy and online), wizards, online help, screen prompts and messages. Also for this discussion, the term "integrated user assistance" is used to describe the mechanisms that deliver assistance to users within software product dialogs themselves. In a software application, these are examples of integrated user assistance: wizards, inline text (multilinetext within the product dialogs), hover help (text boxes that appear over graphic icon buttons), and pop-up windows (text boxes that appear over fields and controls in response to user action). Lastly, for this discussion, "traditional online help" in a software application is used to describe that information that is usually displayed in a window separate from the software application dialogs and is typically invoked when the user clicks a Help button.

A method and system in accordance with the present invention allows the same textual information or a subset of the information to be displayed by both integrated user assistance mechanisms (for example, in a pop-up window or as inline text) and the traditional online help window.

Figure 1:
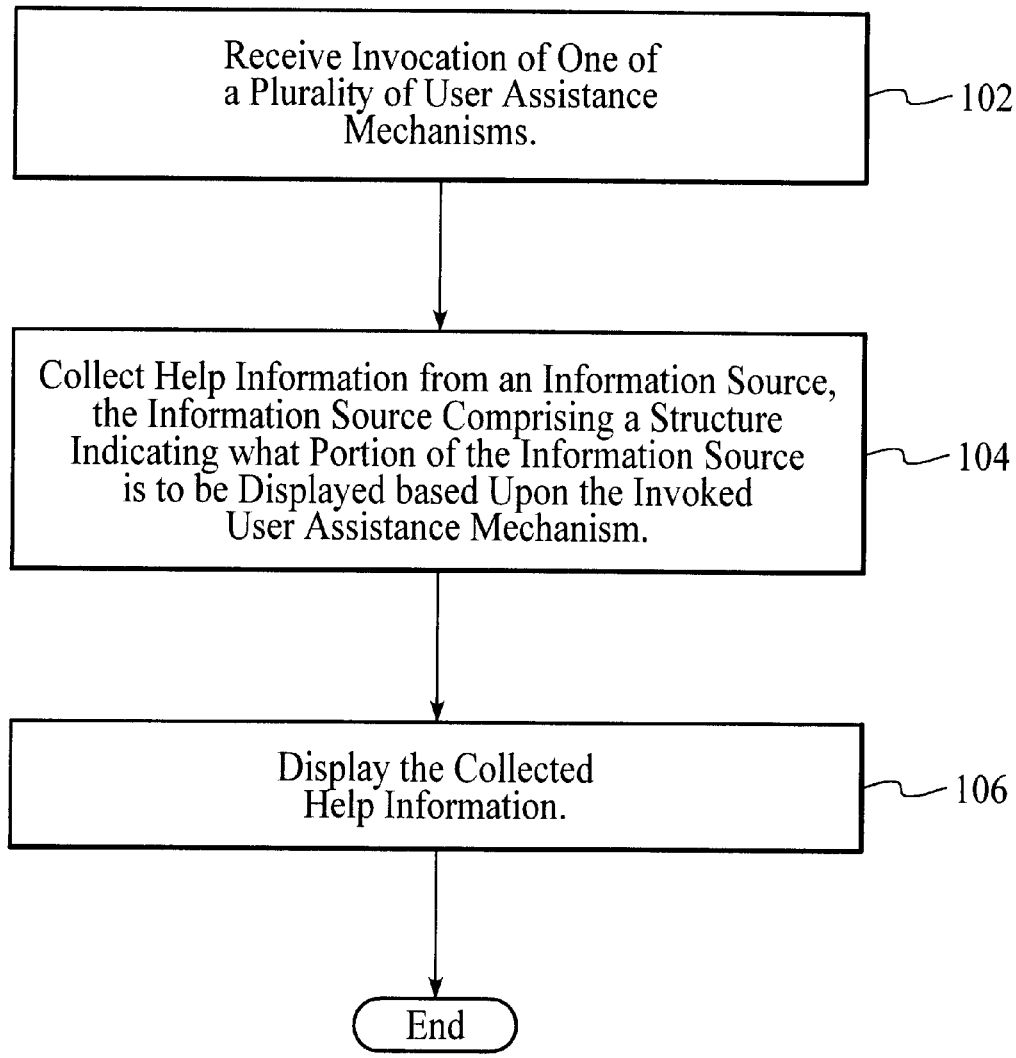
FIG. 1 is a flow chart illustrating a preferred embodiment of a method that allows the same information source to be shared independently of its invocation method in accordance with the present invention.

FIG. 1 is a flow chart illustrating a preferred embodiment of a method for that allows the same information source to be shared independently of its invocation method in accordance with the present invention. First, the invention receives an invocation of one of a plurality of user assistance mechanisms, via step 102. User assistance mechanisms include, but are not limited to, integrated user assistance mechanisms and traditional online help windows. Next, help information is collected from the information source, via step 104. The information source can include, but is not limited to, files, entries in a database, and entities compiled or compressed from an original source. The information source contains a structure which indicates what portion of the information source is to be displayed based upon the invoked user assistance mechanism. Then, the collected help information is displayed, via step 106.

A method and system in accordance with the present invention allows the help information to be shared independent of its invocation method, so that the information can be displayed in both integrated user assistance mechanisms and traditional online help windows. With a method and system in accordance with the present invention, help authors place a metastructure or secondary structure in the information source. This secondary structure indicates which parts of the information source should be displayed by that particular integrated user assistance mechanism. A method and system in accordance with the present invention reads the information source and secondary structure and then takes the information defined by the secondary structure and passes it to the integrated user assistance mechanism to be displayed. For example, the same text information can be retrieved from one source and displayed in the following three places—a traditional online help window, inline text in a software dialog, inside a pop-up window over a control.

Figure 2:
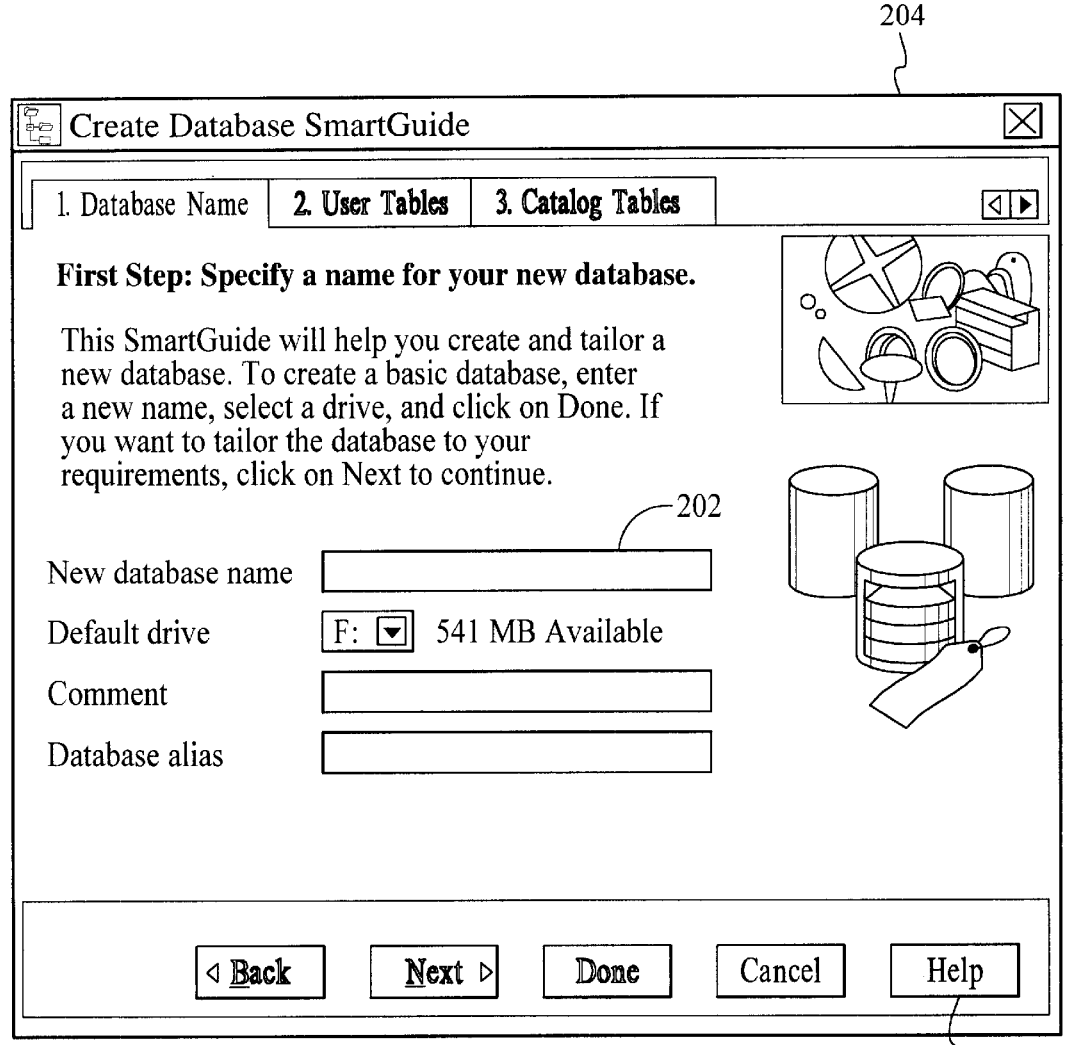
FIG. 2 illustrates a first dialog box in accordance with the present invention.

Here is an example of how a method and system in accordance with the present invention works. In this example, the description of the new database name field 202 inside the application dialog 204 illustrated in FIG. 2 is displayed in both a pop-up window and in a traditional help window, while the text of the description itself is contained in a single HTML file.

Figure 3:
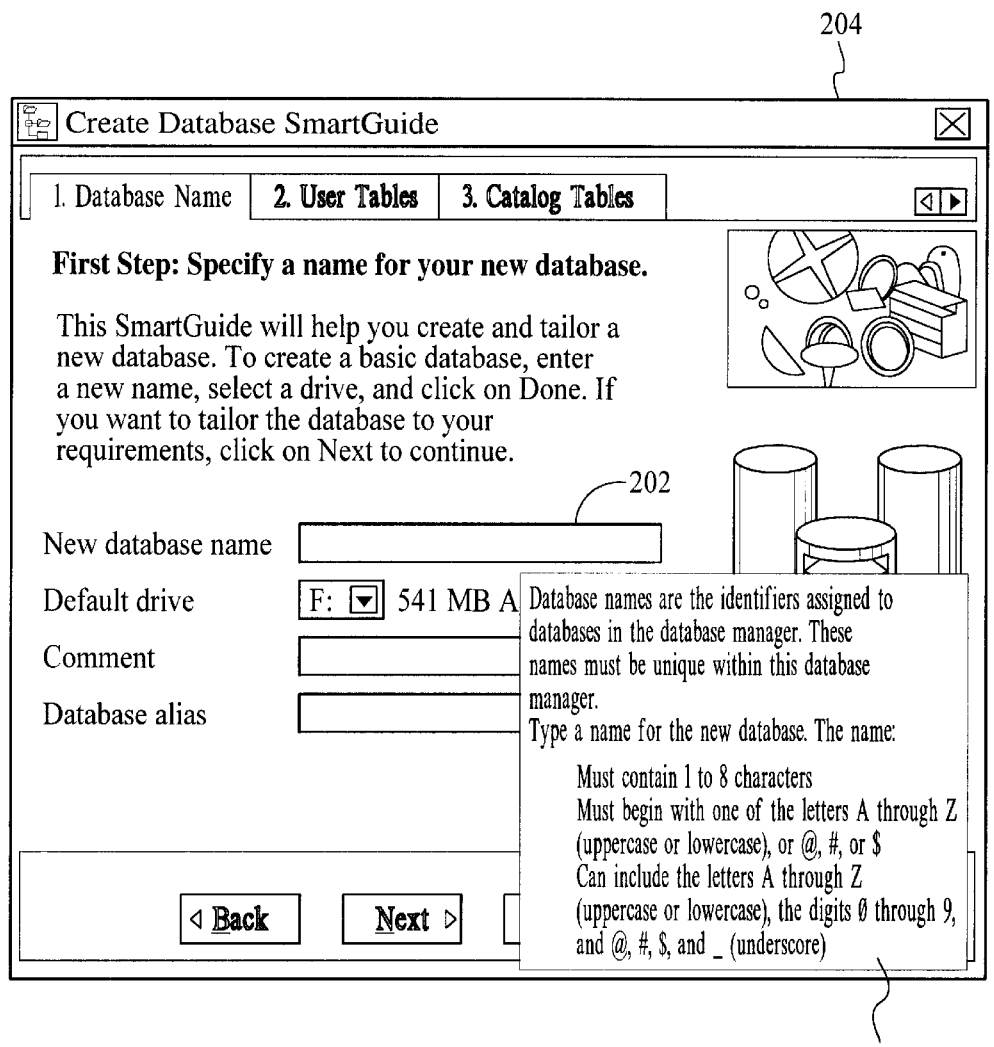
FIG. 3 illustrates a second dialog box in accordance with the present invention.

When the focus is in the new database name field 202 and the user presses the F1 key two (not shown), a pop-up window 302 appears that displays information about what the user can enter for a name in this field, as shown in FIG. 3.

When the user presses the Help button 206 (FIG. 2), the traditional online help window 402 displays the information about all controls on this dialog page 204, including the information about the new database name field 202, as shown in FIG. 4.

Thus, the pop-up window 302 for the new database name field 202 displays a chunk of the information (from "Database names are . . . " to (underscore)") from the source while the online help window 402 shows all the information from the source (more information about the new database name field 202 as well as information about other controls in the window 204, e.g., default drive or directory control).

The invention achieves this result or behavior by looking at the information source and the secondary structure that has been marked within the source. The marking can be done by an author or it can be automated. For this case, the secondary structure is made up of two markers: a marker that indicates the start of the information for each chunk and a marker that indicates the end of the information for each chunk. In the preferred embodiment, target-less anchors are used as markers. FIG. 5 shows the source file for the information in FIG. 4.

In FIG. 5, the marker indicating the beginning of the information to be displayed in the pop-up for the new database name field is:

<A NAME="SPTCRDB_NAME_CTL"></A>

The marker indicating the end of the information to be displayed in the pop-up is:

<A NAME="SPTCRDB_NAME_MORE"></A>

The marker indicating the beginning of the information to be displayed in the pop-up for the next control, the default drive or directory control is:

<A NAME="SPTCRDB_DRIVE CTL"></A>

So, when field-level pop-up help is invoked for a particular control, the invention obtains from a mapping file the name of the information source which contains the help information for the current dialog 204 and the name of the associated marker for the particular control. This invention looks through the information source for a start marker with a name associated with the control (here, "xxxxxCTL") and an end marker with a name following a specified format (here, "xxxxx_MORE"), takes the text that lies in the source between those two markers and displays it in the pop-up window.

Figure 6:
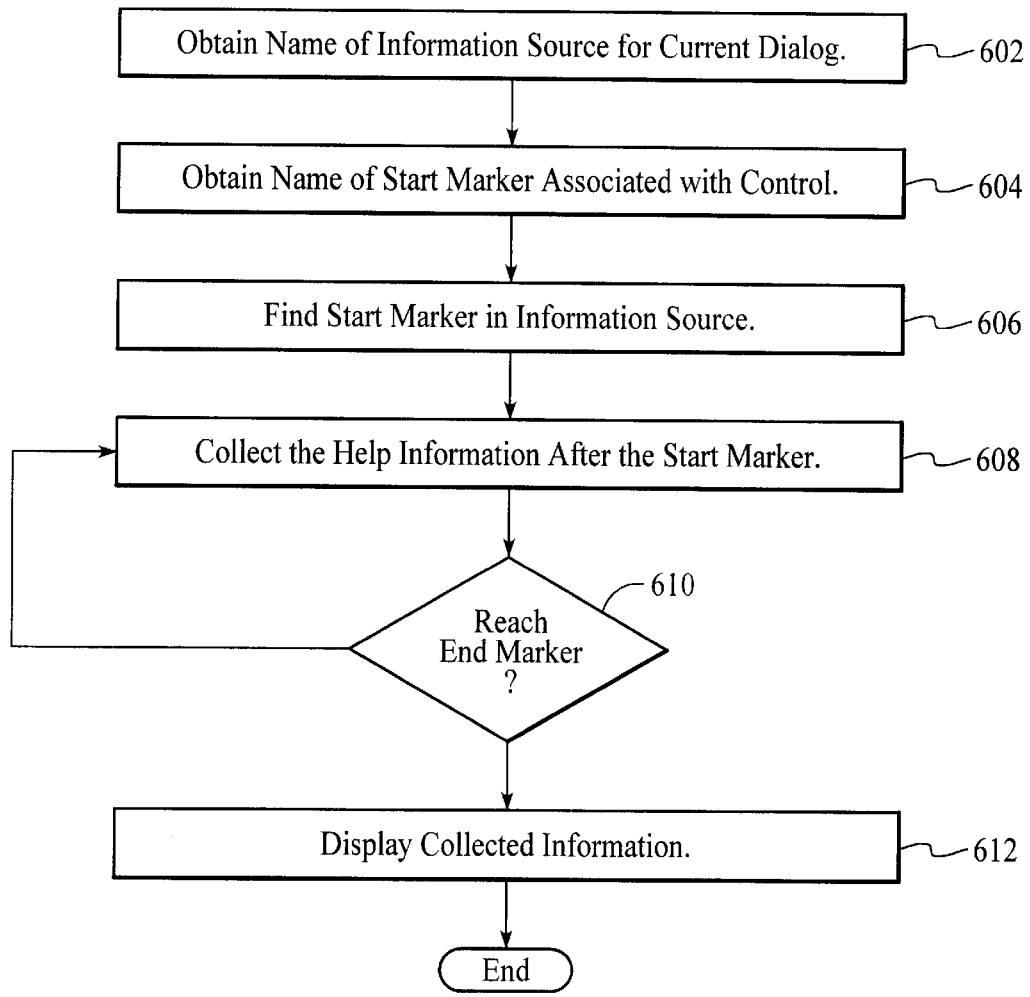
FIG. 6 is a flow chart illustrating in more detail the preferred embodiment of a method for that allows the same information source to be shared independently of its invocation method in accordance with the present invention.

FIG. 6 is a flow chart illustrating in more detail the preferred embodiment of a method that allows the same information source to be shared independently of its invocation method in accordance with the present invention. First, the invention obtains the name of the information source for the current dialog, via step 602. The information source for the example above is the file 502 displayed in FIG. 5. The name of the start marker associated with the control is also obtained, via step 604. For the pop-up help for the new database name field 202, the start marker name is "STCRDB_NAME_CTL". The information source 502 is then read to find the start marker, via step 606. Once found, the invention collects the help information after the start marker until the end marker is reached, via steps 608 and 610. For the pop-up help for the new database name field 202, the help information chunk collected would be the information between the markers <A NAME="STCRDB_NAME_CTL"></A> and <A NAME="STCRDB_NAME_MORE"></A>. Then, the collected help information is displayed, via step 612, as illustrate in FIG. 4.

When the Help button 206 is pressed in the dialog 204 to invoke the traditional online help window 402, the whole information source 502 is displayed. Therefore, in this example, with a method and system in accordance with the present invention, the help author only has to write and update the information in one source that can be used in both pop-up help and traditional online help.

One can think of this secondary structure as a "transparency" overlaid on top of the full information source, and this transparency "highlights" the information content to be used within a particular integrated user assistance mechanism. Multiple layers of transparencies may be used for multiple user assistance mechanisms, for example to "highlight" information that is not a simple linear subsection. These multiple layers allow the mechanism to recursively highlight a section within a section. A method and system in accordance with the present invention goes through the information source, and using the secondary structure, determines which information is "highlighted",for a particular integrated user assistance mechanism, and provides the indicated information to the mechanism to be displayed.

Although the present invention is described in the context of an information source in the HTML format, one of ordinary skill in the art will understand that other markup languages may be used without departing from the spirit and scope of the present invention. For example, well known XML and SGML formats may also be used. Further, markers other than anchor tags may be used.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing help information, comprising the steps of:
   (a) receiving an invocation of a first user assistance mechanism or a second user assistance mechanism, wherein the first user assistance mechanism is a different type of mechanism than the second user assistance mechanism;
   (b) collecting help information from a single integrated information source, the information source comprising a structure indicating that a first portion of the information source is to be displayed if the first user assistance mechanism is invoked and that a second portion of the information source is to be displayed if the second user assistance mechanism is invoked, wherein the first portion is a subset of the second portion; and
   (c) displaying the first portion of the information source if the first user assistance mechanism is invoked and displaying the second portion of the information source if the second user assistance mechanism is invoked, wherein the first portion is displayed without first displaying the second portion, and wherein the second portion is displayed without first displaying the first portion.

2. The method of claim 1, wherein the first or second user assistance mechanism comprises at least one of:
   wizards;
   inline text
   hover help
   pop-up window; and
   traditional online help.

3. The method of claim 1, wherein the information source is in a markup language format.

4. The method of claim 1, wherein the collecting step (b) comprises:
   (b1) finding a start marker associated with the invoked user assistance mechanism in the information source; and
   (b2) collecting the help information until an end marker is reached.

5. The method of claim 4, wherein prior to the finding step (b1) comprises:
   (b1i) obtaining a name of the information source for a current dialog; and
   (b1ii) obtaining a name of the start marker.

6. A computer readable medium with program instructions for providing help information, the instructions for:
   (a) receiving an invocation of a first user assistance mechanism or a second user assistance mechanism, wherein the first user assistance mechanism is a different type of mechanism than the second user assistance mechanism;
   (b) collecting help information from a single integrated information source, the information source comprising a structure indicating that a first portion of the information source is to be displayed if the first user assistance mechanism is invoked and that a second portion of the information source is to be displayed if the second user assistance mechanism is invoked, wherein the first portion is a subset of the second portion; and
   (c) displaying the first portion of the information source if the first user assistance mechanism is invoked and displaying the second portion of the information source if the second user assistance mechanism is invoked, wherein the first portion is displayed without first displaying the second portion, and wherein the second portion is displayed without first displaying the first portion.

7. The medium of claim 6, wherein the first or second user assistance mechanism comprises at least one of:
   wizards;
   inline text
   hover help
   pop-up window; and
   traditional online help.

8. The medium of claim 6, wherein the information source is in a markup language format.

9. The medium of claim 6, wherein the collecting instruction (b) comprises instructions for:
   (b1) finding a start marker associated with the invoked user assistance mechanism in the information source; and
   (b2) collecting the help information until an end marker is reached.

10. The medium of claim 9, wherein prior to the finding instruction (b1) comprises instructions for:
    (b1i) obtaining a name of the information source for a current dialog; and
    (b1ii) obtaining a name of the start marker.

11. A method for providing help information, comprising the steps of:
    (a) receiving an invocation of a first user assistance mechanism or a second user assistance mechanism, wherein the first user assistance mechanism is a different type of mechanism than the second user assistance mechanism;
    (b) obtaining a name of a single integrated information source for a current dialog;
    (c) obtaining a name of a start marker associated with the invoked user assistance mechanism;
    (d) finding the start marker in the information source;

(e) collecting help information until an end marker is reached, wherein the collected help information comprises a first portion of the information source if the invoked user assistance mechanism is the first user assistance mechanism, wherein the collected help information comprises a second portion of the information source if the invoked user assistance mechanism is the second user assistance mechanism, wherein the first portion is a subset of the second portion; and (f) displaying the collected help information, wherein the first portion is displayed without first displaying the second portion, and wherein the second portion is displayed without first displaying the first portion.

12. The method of claim 11, wherein the first or second user assistance mechanism comprises at least one of:
wizards;
inline text
hover help
pop-up window; and
traditional onlined help.

13. The method of claim 11, wherein the information source is in a markup language format.

14. A computer readable medium with program instructions for providing help information, the instructions for:
(a) receiving an invocation of a first user assistance mechanism or a second user assistance mechanism, wherein the first user assistance mechanism is a different type of mechanism than the second user assistance mechanism;
(b) obtaining a name of a single integrated information source for a current dialog;
(c) obtaining a name of a start marker associated with the invoked user assistance mechanism;
(d) finding the start marker in the information source;
(e) collecting help information until an end marker is reached, wherein the collected help information comprises a first portion of the information source if the invoked user assistance mechanism is the first user assistance mechanism, wherein the collected help information comprises a second portion of the information source if the invoked user assistance mechanism is the second user assistance mechanism, wherein the first portion is a subset of the second portion; and
(f) displaying the collected help information, wherein the first portion is displayed without first displaying the second portion, and wherein the second portion is displayed without first displaying the first portion.

15. The medium of claim 14, wherein the first or second user assistance mechanism comprises at least one of:
wizards;
inline text
hover help
pop-up window; and
traditional online help.

16. The medium of claim 14, wherein the information source is in a markup language format.

17. A memory structure containing program instructions for providing help information, the instructions for:
(a) receiving an invocation of a first user assistance mechanism or a second user assistance mechanism, wherein the first user assistance mechanism is a different type of mechanism than the second user assistance mechanism;
(b) collecting help information from a single integrated information source, the information source comprising a structure indicating that a first portion of the information source is to be displayed if the first user assistance mechanism is invoked and that a second portion of the information source is to be displayed if the second user assistance mechanism is invoked, wherein the first portion is a subset of the second portion; and
(c) displaying the first portion of the information source if the first user assistance mechanism is invoked and displaying the second portion of the information source if the second user assistance mechanism is invoked, wherein the first portion is displayed without first displaying the second portion, and wherein the second portion is displayed without first displaying the first portion.

18. The structure of claim 17, wherein the first or second user assistance mechanism comprises at least one of:
wizards;
inline text
hover help
pop-up window; and
traditional help.

19. The structure of claim 17, wherein the information source is in a markup language format.

20. The structure of claim 17, wherein the collecting instruction (b) comprises instructions for:
(b1) finding a start marker associated with the invoked user assistance mechanism in the information source; and
(b2) collecting the help information until an end marker is reached.

21. The structure of claim 20, wherein prior to the finding instruction (b1) comprises instructions for:
(b1i) obtaining a name of the information source for a current dialog; and
(b1ii) obtaining a name of the start marker.

22. A memory structure containing program instructions for providing help information, the instructions for:
(a) receiving an invocation of a first user assistance mechanism or a second user assistance mechanism, wherein the first user assistance mechanism is a different type of mechanism than the second user assistance mechanism;
(b) obtaining a name of a single integrated information source for a current dialog;
(c) obtain a name of a start marker associated with the invoked user assistance mechanism;
(d) finding the start marker in the information source;
(e) collecting help information until an end marker is reached, wherein the collected help information comprises a first portion of the information source if the invoked user assistance mechanism is the first user assistance mechanism, wherein the collected help information comprises a second portion of the information source if the invoked user assistance mechanism is the second user assistance mechanism, wherein the first portion is a subset of the second portion; and
(f) displaying the collected help information, wherein the first portion is displayed without first displaying the second portion, and wherein the second portion is displayed without first displaying the first portion.

23. The structure of claim 22, wherein the first or second user assistance mechanism comprises at least one of:
wizards;

inline text
hover help
pop-up window; and
traditional online help.

24. The structure of claim 22, wherein the information source is in a markup language format.

* * * * *

UNITED STATES PATENT AND TRADEMARK OFFICE
CERTIFICATE OF CORRECTION

PATENT NO.    : 6,573,906 B1
DATED         : June 3, 2003
INVENTOR(S)   : Harding et al.

It is certified that error appears in the above-identified patent and that said Letters Patent is hereby corrected as shown below:

<u>Column 8,</u>
Line 22, after "pop-up", add -- online --.
Line 48, delete "obtain", and replace with -- obtaining --.

Signed and Sealed this

Fifth Day of August, 2003

JAMES E. ROGAN
*Director of the United States Patent and Trademark Office*